United States Patent [19]

de Grijs et al.

[11] 4,356,811

[45] Nov. 2, 1982

[54] SOLAR COLLECTOR

[75] Inventors: Johan C. de Grijs; Herman Bloem, both of Eindhoven, Netherlands

[73] Assignee: U.S. Philips Corporation, New York, N.Y.

[21] Appl. No.: 163,371

[22] Filed: Jun. 26, 1980

[30] Foreign Application Priority Data

Jul. 3, 1979 [NL] Netherlands .......................... 7905158

[51] Int. Cl.³ ................................................ F24J 3/02
[52] U.S. Cl. ................................ 126/433; 165/104.21
[58] Field of Search ........................ 126/433, 444, 900; 165/104.21, 104.26

[56] References Cited

U.S. PATENT DOCUMENTS 4,119,085 10/1978 Knowles et al. ...................... 126/443
4,291,676 9/1981 Asselman et al. ............... 165/104.21

OTHER PUBLICATIONS

"Designer's Guide To Heat Pipes"–Design News–3/18/74, 11 pp.

*Primary Examiner*—Carroll B. Dority, Jr.
*Attorney, Agent, or Firm*—Thomas A. Briody; William J. Streeter; Rolf E. Schneider

[57] ABSTRACT

There is provided a solar collector comprising a solar heat absorber plate thermally conductively connected to the evaporator section of a metal heat pipe. The absorber plate and the evaporator section are surrounded by an evacuated glass envelope joined to the heat pipe at the open end of the evaporator section by a glass-metal seal. The condenser section of the heat pipe is spaced from the evaporator section and is formed for installation in a heat transport system. A flexible portion joins the respective open ends of the evaporator section and the condenser section, such flexible portion having an outer diameter smaller than the inner diameter of the evaporator section and that of the condenser section. The moment of resistance of this flexible portion is smaller than the moment that can be withstood by the glass-metal seal.

2 Claims, 1 Drawing Figure

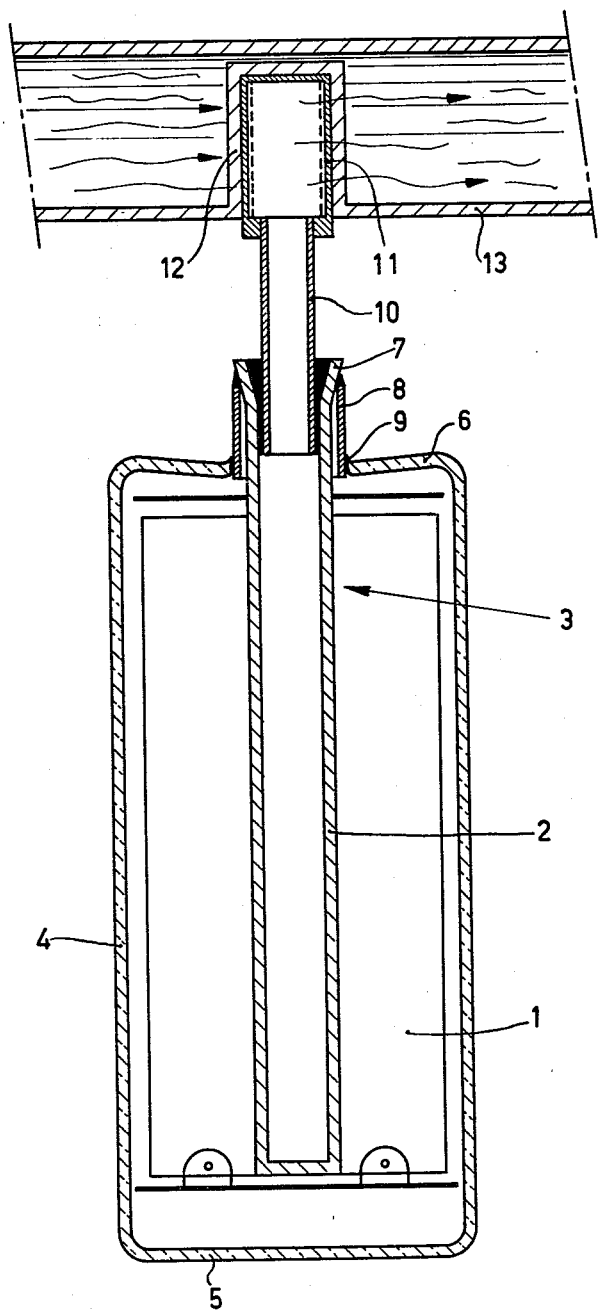

SOLAR COLLECTOR

This invention relates to a solar collector, comprising an absorber plate which absorbs solar heat and which is thermally conductively connected to the evaporator section of a metal heat pipe, the absorber plate and the evaporator section being enclosed by a glass envelope in which subatmospheric pressure prevails, the heat pipe being passed through an end face of the envelope on at least one side and joined to the envelope by a glass-metal seal, it being possible to bring the condenser section of the heat pipe which is situated outside the envelope into heat exchanging contact with a heat transport medium in a heat transport system.

Such a solar collector is known from U.S. Pat. No. 4,119,085. In this type of solar collector, the heat absorbed by the absorber is given off to the evaporator section of the heat pipe. The working medium in the heat pipe transports the heat to the condenser section of the heat pipe by way of an evaporation/condensation cycle. Finally, the condenser section gives off the heat to the transport medium in the heat transport system.

A suitable exchange of heat should occur between the condenser section of the heat pipe and the transport medium in the heat transport system; this can be realized, for example, by accommodating the condenser section in a cavity of the heat transport system with a tight fit.

A problem is then encountered in that in the desired position of the glass envelope, the centre line of the condenser section should coincide with the centre line of the cavity in which the condenser section is to be accommodated. In practice, this leads to very narrow tolerances in the assembly of the solar collector and the heat transport system while, due to improper alignment, large forces are still likely to be exerted on the heat pipe during the correction of the position, thus giving rise to fracturing of notably the glass-metal seal between the metal heat pipe and the end face of the glass envelope.

The present invention has for its objects to provide a solar collector which can be very readily built into a heat transport system, without it being necessary to adhere to very narrow tolerances during the assembly.

A solar collector in accordance with the invention is characterized in that a part of the heat pipe which is situated between the condenser section and the area where the heat pipe is passed through the end wall of the envelope is constructed to be flexible. As a result of the flexible construction of the part or length of the heat pipe between the condenser section and the end face of the envelope, the condenser section position with respect to the remainder of the heat pipe can be chosen by bending so that the condenser section can be readily installed in or introduced into the heat transport system at all times.

The necessity of accurate alignment of the aperture or cavity in the heat transport system and the solar collector is thus eliminated, resulting in a substantial simplification and hence cost saving.

In a further preferred embodiment, the moment of resistance of the flexible part or portion of the heat pipe is smaller than the moment which can be withstood by the glass-metal seal between the metal heat pipe and the glass end wall. This means that during the execution of small corrections the glass-metal seal will never be subjected to a moment which is so large that fracturing of the glass occurs.

Such a smaller moment of resistance can be achieved in accordance with the invention by imparting an outer diameter, and hence a passage, to the flexible part which are smaller than the inner diameter and the passage of the respective connected sections of the heat pipe.

A further embodiment of the solar collector in accordance with the invention is characterized in that the flexible part is made of a material having a modulus of elasticity which is lower than that of the material of the condenser section and that of the material of the evaporator sections.

The invention will now be described in detail with reference to the accompanying drawing showing a sectional view of an embodiment of a solar collector.

The reference numeral 1 denotes a plate-shaped absorber. This absorber 1 is thermally conductively connected to the evaporator section 2 of a metal heat pipe 3.

The absorber 1 and the evaporator section 2 are enveloped by a glass envelope 4 which is closed on one end by a wall 5. On the other end, the envelope comprises an end face 6 wherethrough the evaporator section 2 is passed. Subatmospheric pressure prevails inside the envelope. The passage of the metal evaporator section 2 through the glass end face 6 is constructed as follows. The end 7 of the evaporator section is slightly widened. A metal sleeve 8 is soldered to the outer circumference of this widened portion, said sleeve being fused to the glass of the end face 6 in the form of a glass-metal seal 9.

In the widened portion 7 there is soldered a tube 10 which is made of a metal having a comparatively low modulus of elasticity, for example copper, and which has an outer diameter and an inner diameter which are slightly smaller than those of the evaporator section 2.

The other end of the tube 10 is connected to the condenser section 11 which has a slightly larger inner diameter and whose inner wall comprises parts which stimulate the transfer of heat. In this case a layer of gauze is provided on the inner wall.

The condenser section 11 of the metal heat pipe is accommodated in a cavity 12 of the heat transport system 13.

The tube 10 thus has a moment of resistance which is so low that when a moment is exerted on the condenser section, the vulnerable glass-metal seal 9 is not broken, but always deformation of the tube 10 occurs.

This low moment of resistance is obtained by a suitable choice of materials and by making the outer diameter of the tube 10 smaller than the inner diameter of the evaporator section. The wall thickness is adapted to the maximum pressure occurring in the heat pipe; surprisingly, it has been found that the passage is still sufficient for undisturbed operation of the heat pipe.

As a result of this flexible connection between the evaporator section 2 and the condenser section 11, the solar collector need not be situated exactly on the centre line of the cavity 12 in the wall of the heat transport system. The flexible tube 10 thus enables a correction, so that mounting is always possible.

In a practical embodiment, the evaporator section 2 was made of iron, the condenser section 11 of a copper alloy and the tube 10 of copper.

The inner diameter and the outer diameter of the evaporator section amounted to 6.6 and 8 mm, respectively. The inner diameter and the outer diameter of the copper tube 10 amounted to 5 and 5.9 mm, respectively. The length of the tube 10 amounted to 20 mm. Thus, a solar collector construction is realized which can be readily mounted in a heat transport system as a result of a given degree of freedom of movement between the evaporator section and the condenser section of the heat pipe and which enhances reliability.

What is claimed is:

1. A solar collector, which comprises a metal heat pipe having an evaporator section and a condenser section spaced from each other, said condenser section being formed for installation in a heat transport system; a solar heat absorber plate thermally conductively connected to the evaporator section; an evacuated transparent glass envelope spaced from and surrounding the absorber plate and the evaporator section, said envelope being joined to the heat pipe at an open end of the evaporator section by means of a glass-metal seal; and the heat pipe including a flexible portion joining the open end of the evaporator section and an open end of the condenser section, said flexible portion having an outer diameter and a passage respectively smaller than an inner diameter and a passage of the evaporator section and an inner diameter and a passage of the condenser section, the moment of resistance of said flexible portion being smaller than the moment that can be withstood by the glass-metal seal.

2. A solar collector according to claim 1, in which the flexible portion is made of a metal having an modulus of elasticity lower than that of the metal of the evaporator section and that of the metal of the condenser section.

* * * * *